(12) United States Patent
Lindoff et al.

(10) Patent No.: US 6,700,882 B1
(45) Date of Patent: Mar. 2, 2004

(54) METHOD AND APPARATUS FOR INCREASING THROUGHPUT AND/OR CAPACITY IN A TDMA SYSTEM

(75) Inventors: Bengt Lindoff, Lund (SE); Peter Malm, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/534,629

(22) Filed: Mar. 27, 2000

(51) Int. Cl.[7] .............................. H04B 7/212; H04J 3/00
(52) U.S. Cl. ...................... 370/337; 370/347; 370/350; 370/468; 375/267
(58) Field of Search ................................ 370/468, 328, 370/329, 334, 336, 337, 345, 347, 335, 339, 350, 477; 375/135, 146, 132, 130, 299, 267

(56) References Cited

U.S. PATENT DOCUMENTS

| | | | | |
|---|---|---|---|---|
| 5,592,490 A | * | 1/1997 | Barratt et al. ................ 370/310 |
| 5,930,248 A | | 7/1999 | Langlet et al. |
| 6,067,290 A | * | 5/2000 | Paulraj et al. ................ 370/329 |
| 6,347,223 B1 | * | 2/2002 | Schreib ........................ 455/403 |
| 6,351,499 B1 | * | 2/2002 | Paulraj et al. ................ 375/267 |

* cited by examiner

*Primary Examiner*—Ricky Ngo
*Assistant Examiner*—Henry Sholi

(57) ABSTRACT

In accordance with exemplary embodiments of the invention, throughput and capacity in a TDMA system are increased using several different channels all operating simultaneously on the same carrier frequency. In a first embodiment, a base station in a cell in the system simultaneously transmits a different information sequence from each antenna of a transmitter, on the same carrier frequency. Mobile stations in the cell each receive the signals from the base station antennas as a composite signal, and then use known synchronization information to extract a desired information sequence from the composite signal. In a second embodiment, the different information sequences are all intended for the same mobile station, which uses the synchronization information to extract each sequence from the composite signal. In a third embodiment of the invention, the base station simultaneously transmits identical information sequences to a mobile station via different antennas. The mobile station uses the resulting space diversity effect to obtain diversity gain that enables an increase in the number of channels per area-unit, and thus an increase in traffic and spectrum efficiency. The system can also dynamically employ these to effectively respond to changing demands for communications services within the system.

1 Claim, 8 Drawing Sheets

Antenna arrays, Down-link

Antenna arrays, Up-link

METHOD AND APPARATUS FOR INCREASING THROUGHPUT AND/OR CAPACITY IN A TDMA SYSTEM

BACKGROUND OF THE INVENTION

1. Field of the Invention

The present invention relates generally to communication systems that use Time Division Multiple Access (TDMA) techniques.

2. Description of Related Art

Wireless access in a land mobile radio system is provided by base stations (BSs) located at well-chosen spots. The base stations are equipped with antenna arrangements which give radio coverage in a specific geographical area. These coverage areas are often denoted cells, and, as a consequence, the mobile radio systems are often referred to as cellular radio systems.

Land mobile radio systems are designed to reuse frequency channels. The frequency reuse improves the system's spectrum utilization by allowing the same frequency to be reused in different geographical locations. However, the frequency reuse also implies cochannel interference which is a disadvantage because it degrades the quality of the transmission. A measure of the frequency reuse is the cluster size. A cell cluster is defined as the minimum amount of cells which contain all available frequency channels. The cluster size is a measure of the area coverage. The spectrum efficiency η is an indication of merit for a cellular system. Several different definitions of spectrum efficiency exist, but most of them can be expressed as $$\eta = \frac{\Gamma}{W \cdot \beta \cdot A} \quad (1)$$

where

η=spectrum efficiency,
Γ=throughput per link,
W=bandwidth (in Hertz) per link,
β=cluster size,
A=area of a cell.

A common assumption is to keep the cell-area, A, constant, and account for the effect of frequency reuse by changing β. The bandwidth W is typically a system-specific (given) parameter. What remains to be improved are Γ and the cluster size β. The improvements proposed here will improve one or both of Γ and β by allowing an increased Γ, a smaller β, or both.

SUMMARY OF THE INVENTION

In a communications system such as a wireless communications system having base stations and mobile stations organized into cells and employing TDMA techniques, throughput and capacity in the system are increased by simultaneously transmitting data over a plurality of different multipath or radio channels using the same carrier frequency.

In accordance with a first exemplary embodiment of the invention, information sequences are transmitted simultaneously via different uncorrelated radio-paths from a transmitter, for example a base station, and are each intended for different receivers, for example mobile stations. Each receiver uses known synchronization information to subtract undesired information sequences from the signal it receives, so that only the desired information sequence remains. This technique increases the total spectrum efficiency in the TDMA system by allowing a smaller cluster size.

In accordance with a second exemplary embodiment of the invention, different sequences are transmitted simultaneously via different uncorrelated radio paths, and all of these sequences are intended for the same receiver. The receiver uses known synchronization information to separate the different information sequences, thus providing the receiver with a higher throughput in bits/second.

In accordance with a third exemplary embodiment of the invention, a transmitter transmits identical information sequences over reasonably uncorrelated radio paths to a receiver. A space diversity effect results in the receiver, and the result is that the number of channels per area-unit can be increased using diversity gain. This enables an increase in traffic, and thus an increased spectrum efficiency.

In accordance with exemplary embodiments of the invention, a system can dynamically employ one or more of the above techniques to trade user throughput for number of users, or vice versa, in response to changing demands. For example, a wireless communications service provider can choose in some cases to provide a high throughput to a small number of users, while in other cases it can choose to support a large number of users in a given area.

In accordance with exemplary embodiments of the invention, the transmitter can be a base station in a wireless communications network or system, and the receivers can be mobile stations in the wireless communications network.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION OF THE INVENTION

Exemplary embodiments of the invention are described below in the context of a wireless communications system or network having base stations and mobile stations.

Figure 1:
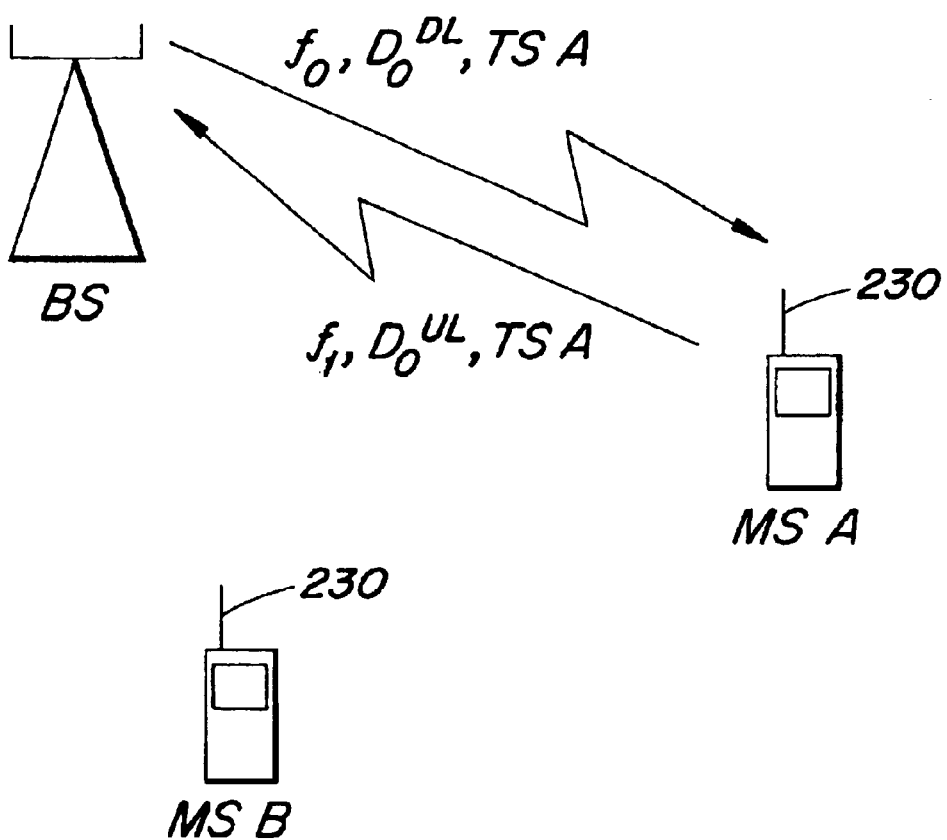
FIG. 1 shows communications between a base station and two mobile stations, in accordance with the prior art.

FIG. 1 shows a conventional scenario known in the art, where a first mobile station (MS A) is connected to a base station (BS) in a particular cell in a TDMA system. The downlink (DL) from the BS to the MS A takes place on a carrier frequency $f_0$, and can carry downlink data $D_0^{DL}$ and a training sequence TS A. The uplink (UL) from the MS A to the BS takes place on a different carrier frequency $f_1$, and can carry uplink data $D_0^{UL}$ and the training sequence TS A. A second mobile station MS B is shown, but is not connected to, i.e., in communication with, the BS. Further, training sequence A, TS A, is the known symbol pattern, transmitted in each burst for synchronization and radio channel estimation purpose. As is well known in the art and specified, for example, in the GSM (Global System for Mobile communications), a training sequence can be included in a signal to be transmitted, so that when a receiver receives the signal, it can use the training sequence to estimate the multipath or radio channel over which the signal traveled from the transmitter to the receiver. Training sequences are pre-known, or in other words, known to both the receiver and the transmitter before a signal including a training sequence is sent or transmitted.

In accordance with a first exemplary embodiment of the invention, capacity in a cell of the wireless communications network is increased. This can be desirable, for example, when a service provider wishes to increase a number of users operating mobile phones in a congested area of the network.

Figure 2A:
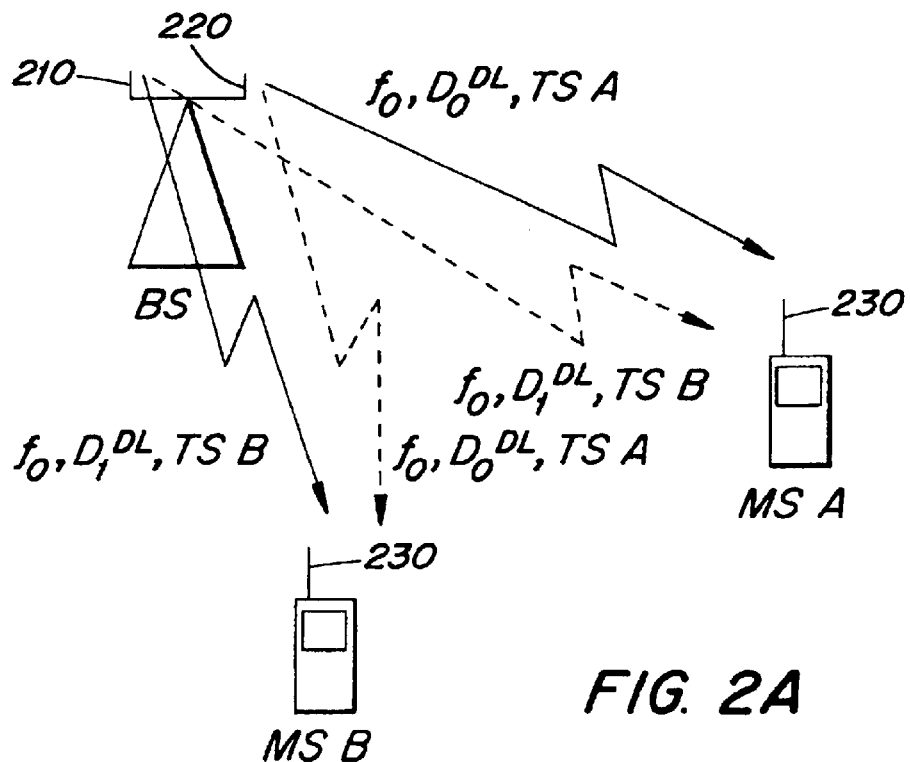
FIGS. 2A–B show communications between a base station and two mobile stations, in accordance with a first exemplary embodiment of the invention.
Figure 2B:
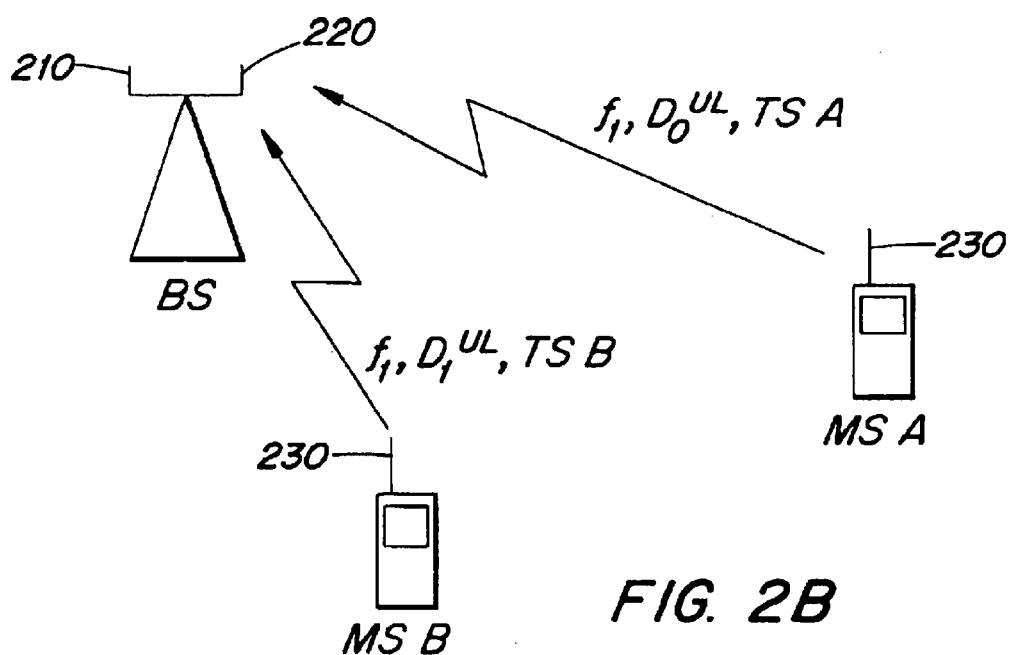

In accordance with the first embodiment and as shown in FIGS. 2A–B, when the signal quality is good enough, i.e., the interference from neighboring cells is low, the base station BS can increase the capacity by allowing the mobile station MS B, to make a connection with the BS using the same carrier frequency as MS A, e.g. $f_0$ in the down-link and $f_1$ in the up-link. The BS sends information to MS A that another MS (MS B) will start using the same carrier frequency as MS A. Also the training sequence information to be used for MS B (TS B) is transmitted to MS A. The same information is given to MS B, i.e., the training sequence MS B should use and also the training sequence that MS A is using are both provided to MS B. This allows both MS A and MS B to connect to the BS using the same carrier frequencies, as shown in FIGS. 2A–B.

In particular as shown in FIG. 2A, the BS has two antennas, 210 and 220. The antenna 210 transmits the training sequence TS B and the downlink data $D_1^{DL}$ on the frequency channel $f_0$, and the antenna 220 transmits the training sequence TS A and the downlink data $D_0^{DL}$ on the same frequency channel, $f_0$. The single antenna 230 on each of the mobile stations MS A, MS B receives the signals transmitted by the BS antennas 210, 220.

Figure 3:
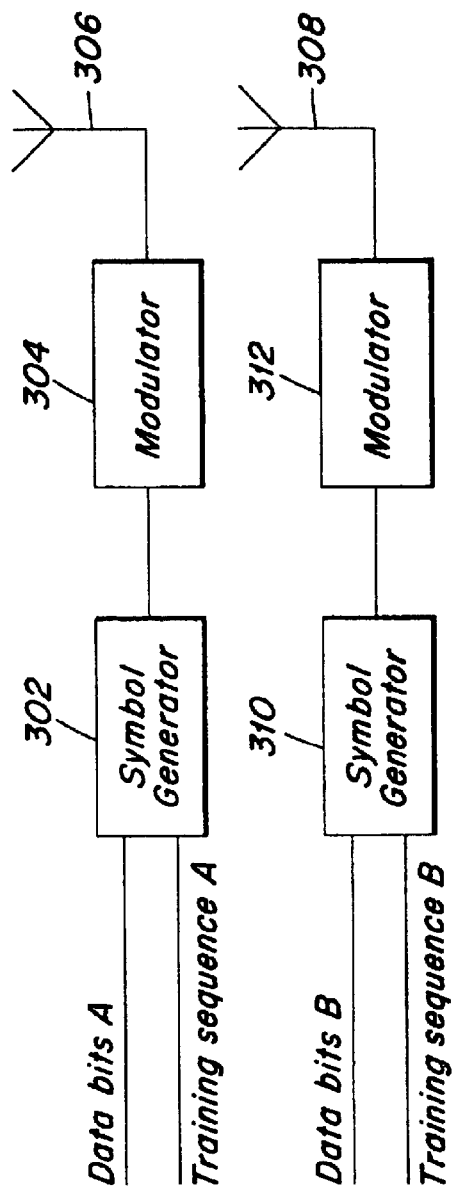
FIG. 3 shows functional components in a transmitter in accordance with exemplary embodiments of the invention.

The DL transmission shown in FIG. 2A works as follows. The information transmitted from the BS is generated according to FIG. 3. The data bits and training sequences for MS A and MS B are grouped into bursts according to a burst structure that is appropriate for the system incorporating this embodiment of the invention, and are fed to symbol generators that map the data bits to information symbols. As shown in FIG. 3, the data and training sequence for MS A are fed to the symbol generator 302, and the data and training sequence for MS B are fed to the symbol generator 310. The symbols from the symbol generators 302, 310 are then fed to corresponding modulators 304, 312 that modulate the carrier frequency with the information symbols. The modulator 304 is connected to an antenna 306, and the modulator 312 is connected to an antenna 308, so that the resulting outputs of the modulators 304, 312 are transmitted. Specifically, the bursts initially provided to the symbol generator 302 are transmitted synchronously on the carrier frequency $f_0$, by the antenna 306, and the bursts initially provided to the symbol generator 310 are transmitted synchronously on the same carrier frequency, $f_0$, by the antenna 308. The antenna 306 can be the antenna 220, and the antenna 308 can be the antenna 210.

The signals for the mobile stations MS A and MS B transmitted by the BS from the antennas 210 and 220 arrive at a mobile station (such as MS A, or MS B) essentially simultaneously. In addition, the signal for MS A and the signal for MS B both arrive at the mobile station via different radio paths because they were each transmitted from different antennas (one from antenna 210, and the other from 220). These features allow the mobile station to distinguish and separate the two signals, as explained in greater detail below. See, also, for example, U.S. Pat. No. 5,995,499.

Figure 4:
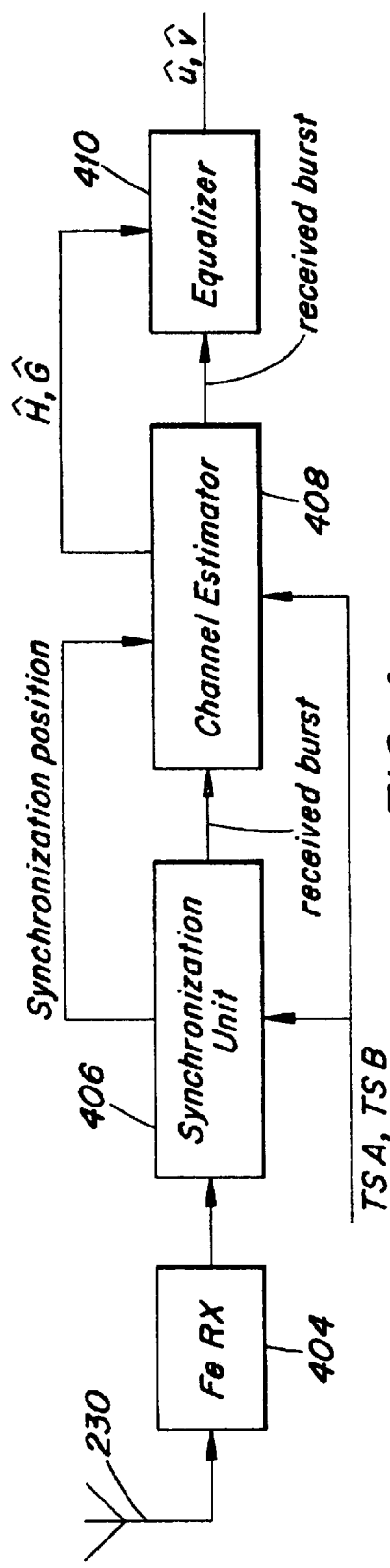
FIG. 4 shows functional components in a receiver in accordance with exemplary embodiments of the invention.

FIG. 4 illustrates a functional block diagram of a receiver that can be used in each of the mobile stations MS A, MS B. The received signal, which includes both the signal transmitted from the BS antenna 210 and the signal transmitted from the BS antenna 220, is down-converted, sampled and filtered in block 404 to obtain a base band signal. The baseband signal in a multi-path environment, sampled at symbol rate, can be written as $$y_t = \sum_{k=0}^{L} h_k \cdot u_{t-k} + \sum_{k=0}^{L} g_k \cdot v_{t-k} + e_t \qquad (2)$$
$$= H^T \cdot U_t + G^T \cdot V_t + e_t$$

where $H=[h_0, \ldots, h_L]$ is the radio channel for the wanted signal, $G=[g_0, \ldots, g_L]$ is the radio channel for the interfering signal, $U=[u_t, \ldots, u_{t-L}]$ is the transmitted (and desired) symbols, $V=[v_t, \ldots, v_{t-L}]$ is the transmitted (interfering) symbols, L is the length of the radio channel impulse response, and $e_t$ is some kind of noise.

See, for example, *Digital Communications*, by J. Proakis, McGraw-Hill Inc., New York, 1995.

The baseband signal is fed from the block 404 to a synchronization unit 406 that correlates the received sequence with the known training sequences (TS A and TS B, for example) in order to find a synchronization position. The synchronization position (Sync. pos) together with the received burst are then provided to a channel estimator 408 that simultaneously estimates the radio channels ($\hat{H}$, $\hat{G}$) for the signals ^^and v̂. Where only one of the signals is intended for the mobile station, the intended signal is the desired signal û, and the other signal ^^is considered to be an interfering signal, which is a desired signal for a different mobile station (MS B, for example). The signals û, ^^can be distinguished since the information to MS A and MS B are transmitted synchronously and from different antennas. The synchronous transmission implies that the desired and interfering bursts arrive simultaneously at an arbitrary MS. The broadcast antenna arrangement at the BS differentiates the radio channel for the desired and interfering signals, by causing the signals to travel along different multipath channels or radio channels from the BS antennas to the MS antenna. Thus, simultaneous estimation of the channels can be done. The channel estimation can be based on Least-Squares techniques, which are well known in the art.

Finally, channel estimator 408 provides the estimated channels ($\hat{H}$, $\hat{G}$) and the received burst to an equalizer 410, which jointly detects both the desired signal ^and the interfering signal v̂. The joint detector can be of any suitable type. For example, an MLSE (Maximum Likelihood Sequence Estimation) can be used for the "desired" signal, and a DFE (Decision Feedback Equalizer) can be used for the "interfering" signal. Such techniques are known in the art. See, for example, *Digital Communications*, by J. Proakis, McGraw-Hill Inc., New York, 1995; and *Equalization of Co-Channel Interference in Future Mobile Communications Systems*, by A. Nilsson-Stig and H. Perbeck, Technical Report, Masters Thesis, Ericsson Mobile Communications AB Sweden, 1998.

In UL transmission, which is shown for example in FIG. 2B, the mobile stations MS A and MS B transmit data back to the BS. Transmitters in the mobile stations MS A and MS B can have the same structure and function as shown in FIG. 3 and described above, with a symbol generator and modulator connected to each antenna that the mobile station is equipped with. For example, MS A can include the upper sequence shown in FIG. 3 of the symbol generator 302, the modulator 304 and the antenna 306, where the antenna 306 corresponds to the antenna 230. The MS B can include the lower sequence shown in FIG. 3 of the symbol generator 310, the modulator 312 and the antenna 308, where the antenna 308 corresponds to the antenna 230. In a similar fashion to that described above with respect to FIG. 3, the data bits and training sequence for each MS are grouped into bursts according to the specification for the cellular system in which the MSs are participating, and are mapped to symbols. These symbols are then used to modulate the carrier frequency $f_1$ and generate transmission signals. The bursts or signals are transmitted from the different mobile stations in such a way that they arrive at the same time at the BS.

Timing the transmissions from the mobile stations MS A, MS B so that they arrive at the same time at the BS can be done by using timing advance information. This information can include information that the BS and the mobile stations MS A and MS B need to have about the distance between the mobile stations MS A, MS B and the BS. When the mobile station knows the distance to the BS, it also knows when to transmit in order to make the burst arrive at the BS at the correct time instant. The concept of timing advance is used in TDMA systems, like GSM, and is well known in the art.

The receiver structure in the BS is similar to the structure in the MS, as shown for example in FIG. 4 and described further above, with the exception that the BS has an antenna array. Thus, the joint detection procedure can be made more complex giving a better receiver performance at the BS compared to the MS.

The system's performance in terms of spectrum efficiency can be enhanced by up to a factor of roughly √2 (on average) in both UL and DL. The reuse distance must be increased, but the number of users per cell optimally doubles.

In accordance with a second preferred embodiment of the invention, throughput to a particular MS can be increased. This can be useful, for example, to wireless communication service providers who wish to increase throughput to a specific user. If the signal quality in a cell in the wireless communication network is good enough, i.e., interference from neighboring cells is low, a base station in the cell can increase the data rate to a mobile station in the cell by simultaneously sending multiple information sequences to the mobile station using a) the same carrier frequency $f_0$, and b) different training sequences in each information sequence. Each information sequence is transmitted using a different antenna of the base station, which yields roughly uncorrelated radio-paths for the information sequences.

Figure 5A:
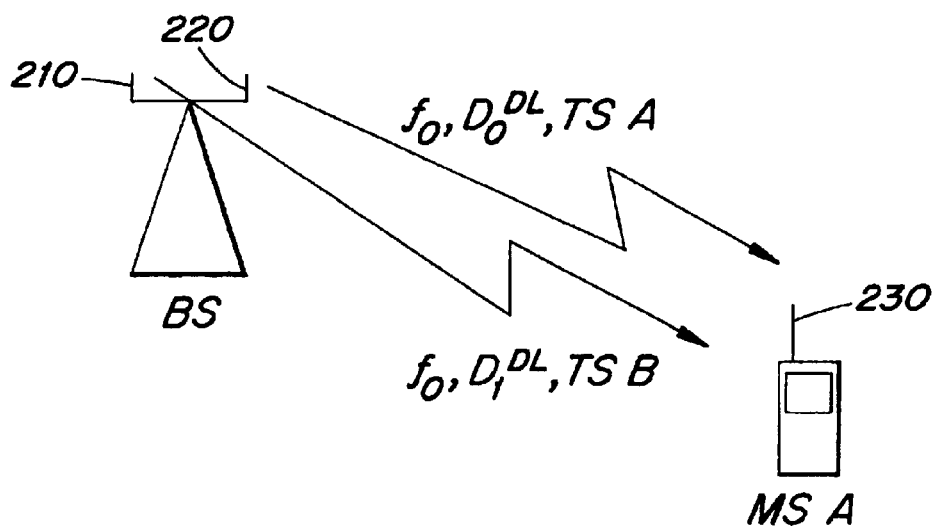
FIGS. 5A–B show a mobile station in communication with a base station in accordance with a second exemplary embodiment of the invention.
Figure 5B:
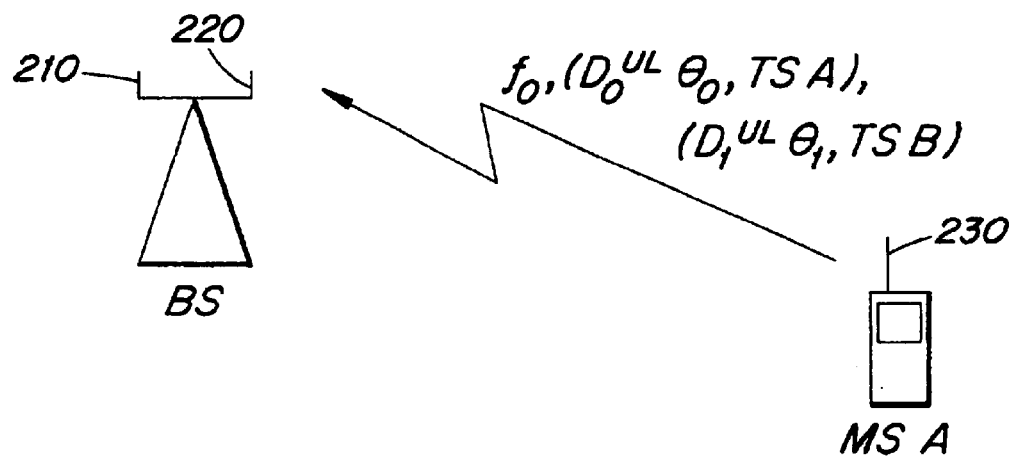

This arrangement is shown in FIGS. 5A–B. As shown in FIG. 5A, the BS transmits a first information sequence from the antenna 220 on the carrier frequency $f_0$, including the training sequence TS A and data $D_0^{DL}$. The BS also transmits a second information sequence from the antenna 210 on the same carrier frequency $f_0$, with a different training sequence TS B and different data $D_1^{DL}$. The transmit procedure in the DL is the same as described above with respect to FIG. 2A, except that in this case the mobile station MS A captures both information sequences instead of keeping one and discarding the other. The receiver procedure in MS A is also similar to that described above, but in this case the estimated symbols ^obtained in the equalizer also contain desired data and are stored and used in the further processing of the received symbols.

Since the mobile station MS A has only one antenna 230, the UL will however be different from the DL. This is because the mobile station MS A will transmit two information sequences or signals at the same time from the single antenna 230, and therefore the signals transmitted from the MS A will arrive at an antenna of the BS via the same multipath channel or radio channel/radio-path. This can give rise to ambiguity when the BS attempt to decode or separate the signals. Therefore, in accordance with the second embodiment, uplink sequences are transmitted with different phase-offsets. As shown in FIG. 5B, the mobile station MS A simultaneously transmits 2 information sequences to the BS over the carrier frequency $f_0$. The first information sequence has a data sequence $D_0^{UL}$, a phase-offset $\theta_0$, and a training sequence TS A. The second information sequence has a different data sequence $D_1^{UL}$, a different phase offset $\theta_1$, and a different training sequence TS B. Alternatively, the MS A can transmit the 2 information sequences to the BS over a different carrier frequency, for example $f_1$.

A phase off-set is the same as a constant angular rotation between transmitted symbols. For instance, assume that an information sequence A uses offset $\theta_0$ and an information sequence B uses offset $\theta$. Moreover, assume 8-PSK (8 Phase Shift Keying) is the applied modulation type. Then, $$u_t = e^{j\theta_0 t} \cdot w_t$$

$$v_t = e^{j\theta_1 t} \cdot z_t$$

where $w_t$ and $z_t$ are 8-PSK symbols. The received signal at the base station can be written as $$y_t = \sum_{k=0}^{L} h_k \cdot u_{t-k} + \sum_{k=0}^{L} g_k \cdot v_{t-k} + e_t \qquad (4)$$

$$= \sum_{k=0}^{L} h_k \cdot e^{j\theta_0(t-k)} \cdot w_{t-k} + \sum_{k=0}^{L} g_k \cdot e^{j\theta_1(t-k)} \cdot z_{t-k} + e_t$$

$$= e^{j\theta_0 t} \cdot \hat{H}^T \cdot W_t + e^{j\theta_1 t} \cdot \hat{G}^T \cdot Z_t + e_t$$

where $$\hat{H} = [h_0, h_1 e^{-j\theta_0}, \ldots, h_L e^{-j\theta_0 L}]$$

$$\hat{G} = [g_0, g_1 e^{-j\theta_1}, \ldots, g_L e^{-j\theta_1 L}]. \qquad (5)$$

As can be seen from expression (5) the radio channels for the information sequences are different and can therefore be identified in the BS channel estimator 408. This allows the information to be decoded in the BS equalizer 410.

The system's performance in terms of spectrum efficiency can be increased by a factor of √2 (roughly). This comes (see expression (1)) from the fact that each user's throughput increases by a factor of 2, while the cluster size β only increases by approximately a factor of √2. The net effect on the spectrum efficiency is then √2 on average. The increase in spectrum efficiency applies to the UL as well as to the DL, if the phase-shifted modulation is applied in the UL. Phase-shifted modulation typically requires a high C/I (Carrier to Interference ratio) to operate satisfactorily.

In accordance with a third exemplary embodiment, traffic within a cell in a wireless communication network, or a maximum level of traffic that the cell can support, can be increased using diversity gain. Diversity gain is a ratio of a) signal field strength obtained by diversity combining, to b) the signal strength obtained by a single path. Space diversity is achieved using different antennas or antenna arrangements. The less correlated the propagation paths or multipath/radio channels are, the larger the diversity gain.

The idea here is to transmit identical information sequences in the DL on the same carrier frequency, at the same time, while using two different antennas or antenna arrangements. In other words, one information sequence is simultaneously transmitted from each of the two antennas. Identical training sequences are provided in the two information sequences, which typically makes detecting the training sequences easier. However, a different training sequence in each information sequence can alternatively be used.

Figure 6A:
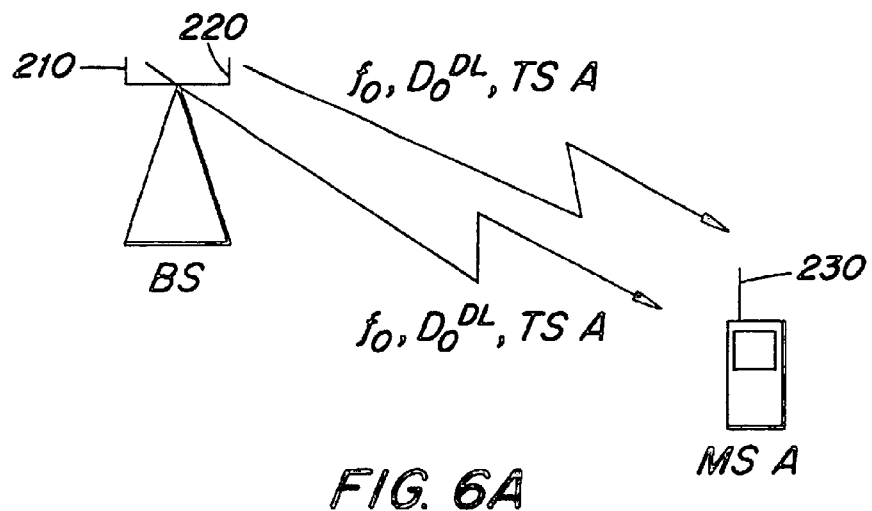
FIGS. 6A–C show a mobile station in communication with a base station accordance with a third exemplary embodiment of the invention.

As shown in FIG. 6A, the BS transmits the same data sequence $D_0^{DL}$ and the same training sequence TS A downlink to the MS A via both BS antennas 210, 220. The receiver receives the sum of the two radio-paths (i.e., the radio-paths between the MS A and the two BS antennas 210, 220), and uses standard equalizing techniques known in the art to detect the data information. Since the datastreams transmitted from the BS antennas 210, 220 both include the same training sequence, the datastreams cannot be separated at the receiver. However, receiving a sum of two uncorrelated radio-paths implies that the probability of receiving a low signal strength is reduced compared to the case when receiving only one radio-path. This allows the cluster size to be reduced, thereby offering a larger number of radio-channels to the user in each cell. The diversity effect enables a spectrum efficiency gain of up to √2 in the DL.

Figure 6B:
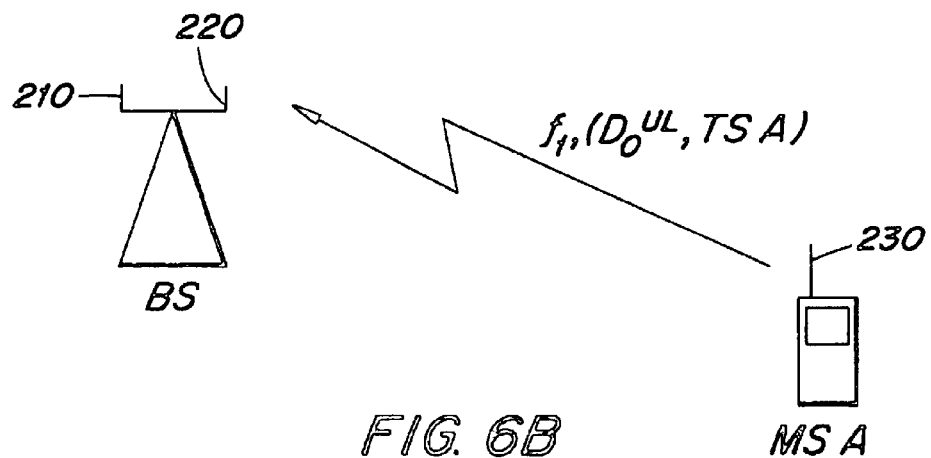
Figure 6C:
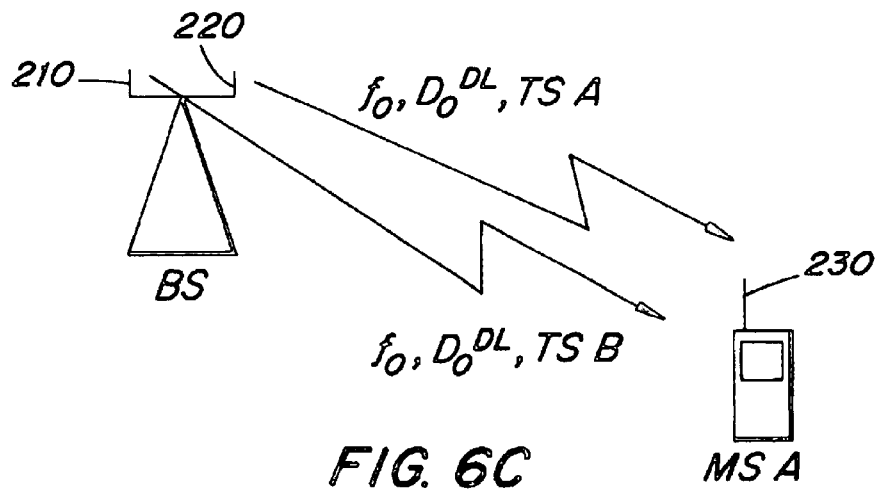

As shown in FIG. 6C, the BS transmits the same data sequence $D_0^{DL}$ from each of the BS antennas 210, 220, but with different training sequences TS A, TS B. Since the training sequences are different, the datastreams can be separated at the receiver. After the two information sequences are detected and equalized or separated at the receiver, in the same fashion described above with reference to FIG. 4, they are added coherently to achieve a diversity effect which can be used to obtain a diversity gain that allows the cluster size to be reduced and the spectrum efficiency to be increased.

Although the MS A has only a single antenna 230, the diversity effect can also be present in the UL if the BS uses both its antennas 210, 220. As shown in FIG. 6B, the MS transmits a single information sequence, including the data sequence $D_0^{UL}$ and the training sequence TS A, via the uplink carrier frequency $f_1$. The signal transmitted in the uplink from the MS A will reach both of the BS antennas 210, 220. Since the propagation paths or multipath/radio channels from the BS antennas 210, 220 to the MS A antenna 230 are different, the propagation paths or multipath/radio channels from the MS A antenna 230 to the BS antennas 210, 220 will also be different, and the BS can use received signals from the antennas to a diversity effect and diversity gain. For example, the BS can separately equalize the signals received by the antennas 210, 220, and then coherently add the resulting (identical) information sequences to achieve a diversity effect which can be used to obtain a diversity gain in the UL. This can be implemented, for example, by providing a separate receiver, like that shown in FIG. 4, in the BS for each of the antennas 210, 220. Alternatively, the BS can store signals received by the antennas 210, 220, sequentially process the signals, and coherently add the results to obtain to achieve diversity effect and obtain diversity gain.

Figure 7A:
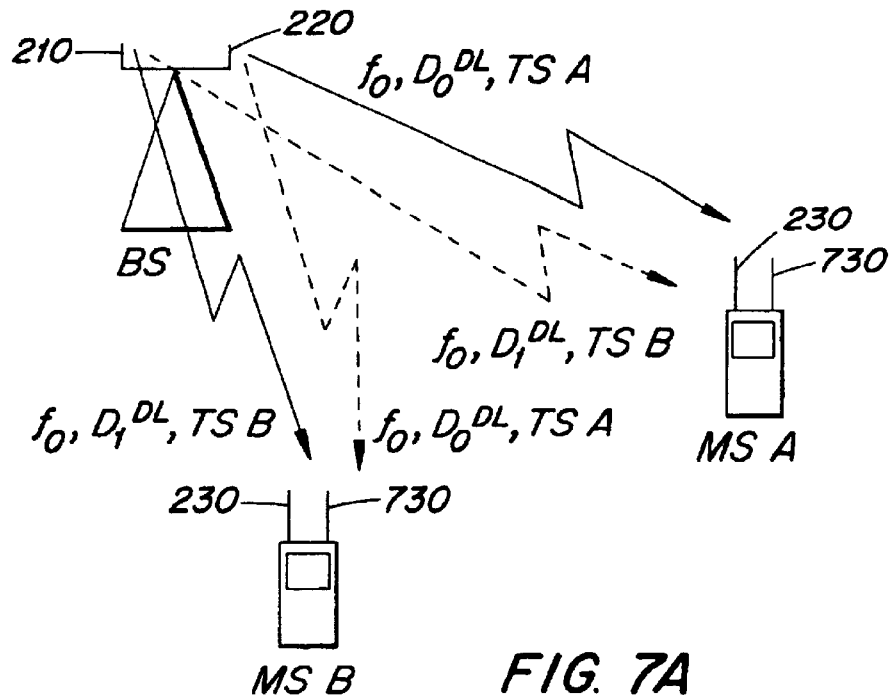
FIGS. 7A–B show mobile stations in communication with a base station accordance with a fourth exemplary embodiment of the invention.
Figure 7B:
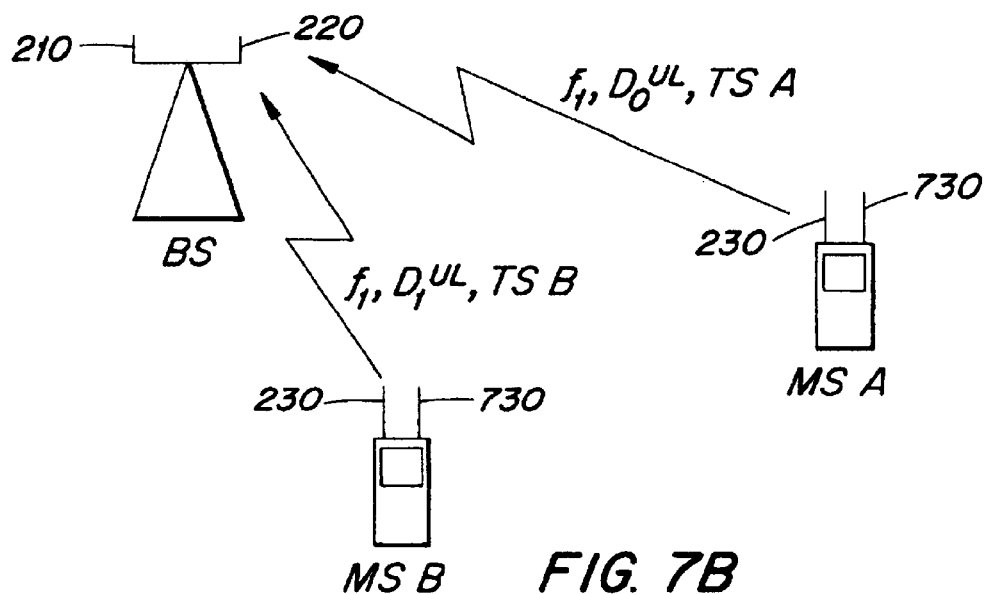
Figure 8A:
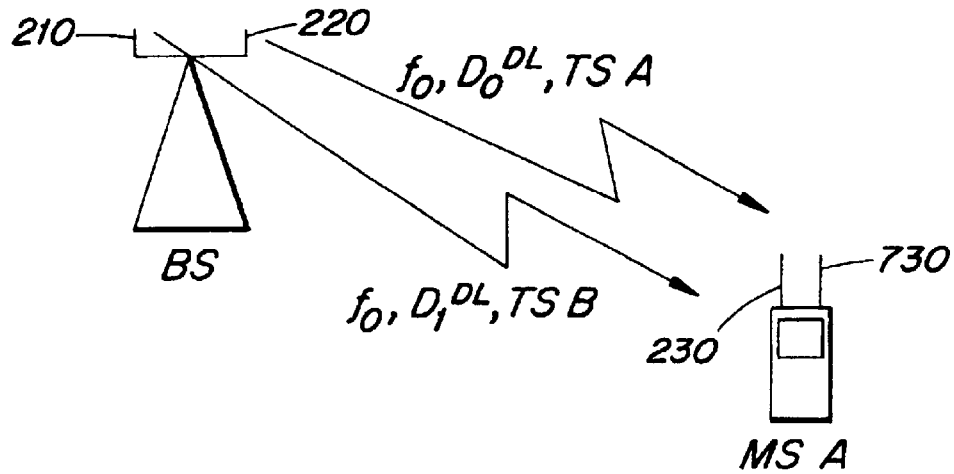
FIGS. 8A–B show a mobile station in communication with a base station accordance with the fourth exemplary embodiment of the invention.

FIGS. 7A–B show a fourth embodiment, which is similar to that shown in FIGS. 2A–B, but has additional antennas 730 provided so that the mobile stations MS A, MS B each have 2 antennas 230, 730 at different spatial locations. Operation can be the same in both UL and DL as that described above with respect to FIGS. 2A–B, where cell capacity is increased. In this situation, the mobile stations MS A, MS B each would need only use one of the antennas 230, 730 to receive in DL and transmit in UL. Mobile stations with 2 antennas can also operate in DL in the same fashion as shown in FIG. 5A (see FIG. 8A), and in the same fashion as shown in FIG. 6A, again using only one of the two MS antennas 230, 730.

Figure 8B:
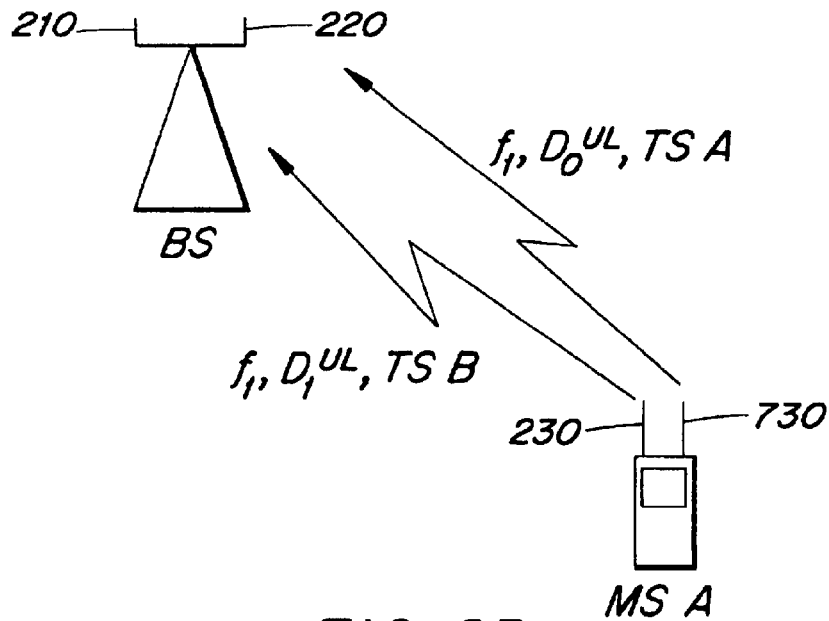

Providing a mobile station with 2 antennas also provides additional capabilities. For example, instead of using phase-offsets to simultaneously transmit different data sequences and training sequences uplink to the BS on the same carrier frequency, a mobile station with 2 antennas can omit the phase-offsets and simply transmit one data sequence and training sequence using one of the MS antennas 230, 730, while simultaneously transmitting the other data sequence and training sequence using the other one of the MS antennas 230, 730, as shown for example in FIG. 8B.

Figure 9:
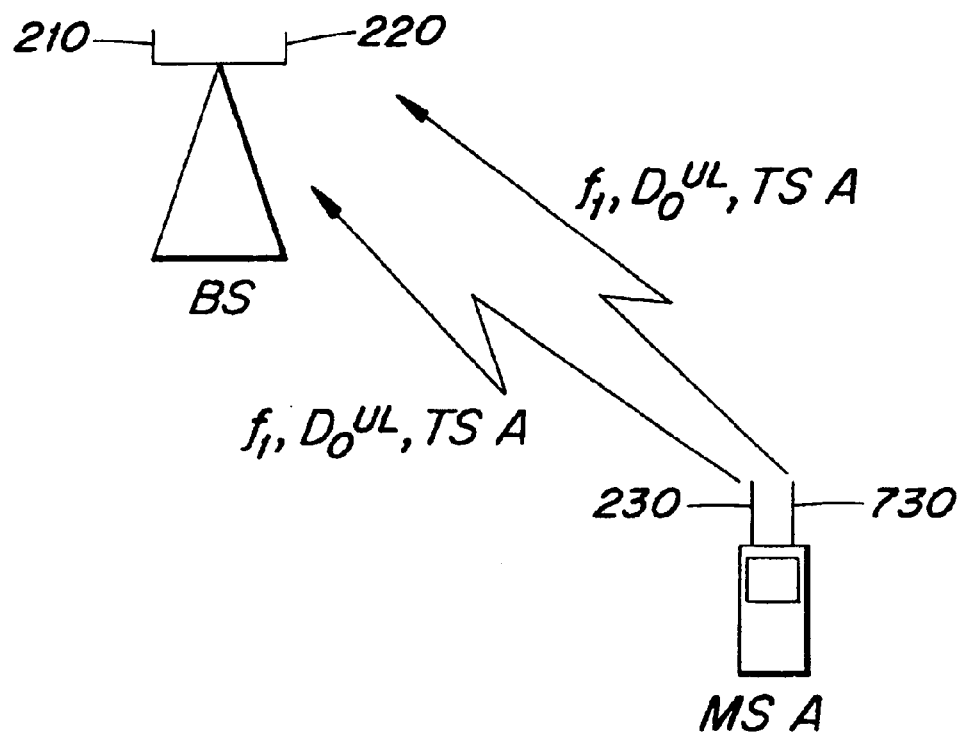
FIG. 9 shows a mobile station in communication with a base station accordance with a fifth exemplary embodiment of the invention.

Providing a mobile station with 2 or more antennas effectively allows the mobile station to function in uplink in the same way that the BS functions in downlink as described above with respect to the first 3 embodiments. This also allows the BS to function in downlink in the same way that the mobile stations function in uplink as described above with respect to the first 3 embodiments. For example, as shown in FIG. 9, the mobile station MS A with antennas 230, 730 can operate in uplink in the same way that the BS shown in FIG. 6A operates in downlink, by simultaneously transmitting the same data sequence and training sequence on each of the antennas 230, 730 via the same carrier frequency. In this situation the BS can receive the signals from the MS A using one of the 2 BS antennas 210, 220, and then process the received signals in the same way as described above with respect to the mobile station of FIG. 6A.

Other variations are also possible. For example, although the base stations described above have 2 antennas or antenna arrangements and the mobile stations in FIGS. 7–9 have 2 antennas, base stations and mobile stations can each be provided with more than 2 antennas, and more than 2 mobile stations can share a carrier frequency, in accordance with the principles described above. In addition, different ones of the techniques described above can be simultaneously and/or fully or partially applied, within a communications network and within a single cell in the network. For example, within a cell several mobile stations could communicate with a base station using the technique shown in FIGS. 2A–B, while other mobile stations in the cell communicate with the base station on different carrier frequencies using the techniques shown in FIGS. 5A–B and 6A–B.

The techniques described above can be dynamically employed in a communication system in response to changing demands, for example to change throughput or capacity.

For example, a wireless communications service provider can choose in some cases to provide a high throughput to a small number of users, while in other cases it can choose to support a traffic increase in a given area.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. In a Time Division Multiple Access (TDMA) radio communication system, a method of transmitting information from a base station to a first mobile station and/or a second mobile station, said base station having a first and second symbol generator, a first and second modulator, and a first and second antenna for generating first and second signals, said method comprising the steps of:

dynamically selecting one of the following transmission techniques based on available signal quality and bandwidth demands of the first and second mobile stations:

(a) simultaneously transmitting to the first mobile station, the first and second signals on a single carrier frequency, each of said signals including a different training sequence and a different data set, thereby increasing the bandwidth of a link between the base station and the first mobile station;

(b) simultaneously transmitting to the first mobile station, the first and second signals on a single carrier frequency, each of said signals including a different training sequence and the same data set, thereby providing a transmit diversity gain for the link between the base station and the first mobile station; and (c) simultaneously transmitting to the first and second mobile stations, first and second signals on a single carrier frequency, said first signal including the first training sequence and a first data set with information intended for the first mobile station, and said second signal including the second training sequence and a second data set with information intended for the second mobile station, thereby improving the efficiency with which the radio communication system utilizes its available frequency spectrum.

* * * * *